US007225051B1

(12) United States Patent
Christensen et al.

(10) Patent No.: US 7,225,051 B1
(45) Date of Patent: May 29, 2007

(54) CLOSED-LOOP FEEDBACK FOR MAXIMIZING CPK IN PROGRESSIVE FORMING OPERATIONS

(75) Inventors: Thomas Christensen, Hutchinson, MN (US); Donald Granata, Minnetonka, MN (US); Steve Misuta, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 103 days.

(21) Appl. No.: 11/197,117

(22) Filed: Aug. 4, 2005

(51) Int. Cl.
*G06F 19/00* (2006.01)
*G05B 13/02* (2006.01)
*B23P 19/00* (2006.01)
*H05K 3/30* (2006.01)

(52) U.S. Cl. .................. 700/193; 700/51; 700/186; 700/192; 700/195; 356/396; 356/397; 356/398; 29/741; 29/742; 29/833; 29/834

(58) Field of Classification Search ............... 700/51, 700/52, 108, 110, 174, 186, 192, 193, 194, 700/195, 37, 45, 95; 29/833, 834, 741, 742; 356/396, 397, 398
See application file for complete search history.

(56) References Cited

U.S. PATENT DOCUMENTS

| | | | |
|---|---|---|---|
| 4,544,820 A | 10/1985 | Johnson | |
| 5,301,585 A | 4/1994 | Hosaka | |
| 5,669,866 A | 9/1997 | Julian et al. | |
| 5,687,209 A * | 11/1997 | Adams | 378/22 |
| 6,128,987 A | 10/2000 | Nakagawa et al. | |
| 6,192,575 B1 | 2/2001 | Neuenschwander | |
| 6,345,526 B1 | 2/2002 | Deriaz et al. | |
| 6,581,202 B1 * | 6/2003 | Tourne et al. | 716/20 |
| 6,688,201 B1 | 2/2004 | Dokyu et al. | |
| 6,765,848 B2 | 7/2004 | Faucett | |
| 6,766,723 B2 | 7/2004 | Yasoda et al. | |
| 6,807,726 B2 * | 10/2004 | Iisaka et al. | 29/740 |
| 6,843,156 B1 | 1/2005 | Irwin | |
| 7,036,215 B2 * | 5/2006 | Kodama | 29/832 |
| 2003/0208740 A1 * | 11/2003 | Tourne et al. | 716/20 |
| 2005/0205778 A1 * | 9/2005 | Kitai et al. | 250/309 |
| 2005/0265814 A1 * | 12/2005 | Coady | 414/744.5 |
| 2006/0114437 A1 * | 6/2006 | Akhssay et al. | 355/55 |
| 2006/0283011 A1 * | 12/2006 | Muller et al. | 29/834 |

\* cited by examiner

*Primary Examiner*—Ramesh Patel
(74) *Attorney, Agent, or Firm*—Howrey LLP

(57) ABSTRACT

A method and system for maximizing process capability in a progressive forming operation. The method compensates for deviations introduced by unformed components, and uses closed loop feedback to compensate for deviations introduced by forming tools. Fiducial features are detected on an incoming component, and a first compensation value is calculated from displacement of the fiducial features from an ideal forming location on the component. Component position with respect to a theoretical forming position is adjusted according to the first compensation value. Placement of a feature formed on the component at the adjusted position is detected and compared to the ideal forming location to obtain a difference value. A second compensation value is derived from a plurality of difference values. Forming positions for subsequent incoming components are adjusted with respect to the theoretical forming position according to first and second compensation values. A system according to the invention comprises a loading station for incoming components, an imaging subsystem for detecting deviations, a computer for calculating compensation values, a conveyor for positioning components, and one or more forming tools for forming a feature on the component. The computer subsystem comprises a central controller for actuating system components, collecting and storing data, and executing compensation algorithms.

68 Claims, 11 Drawing Sheets

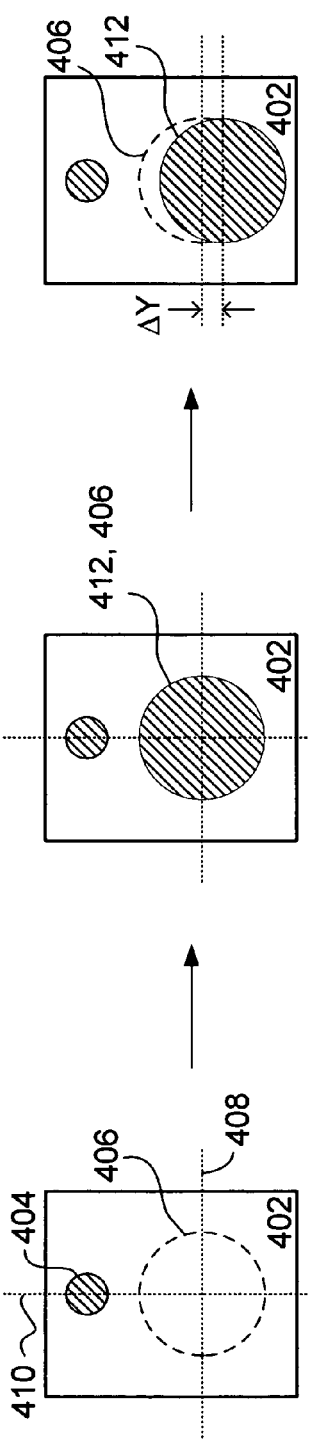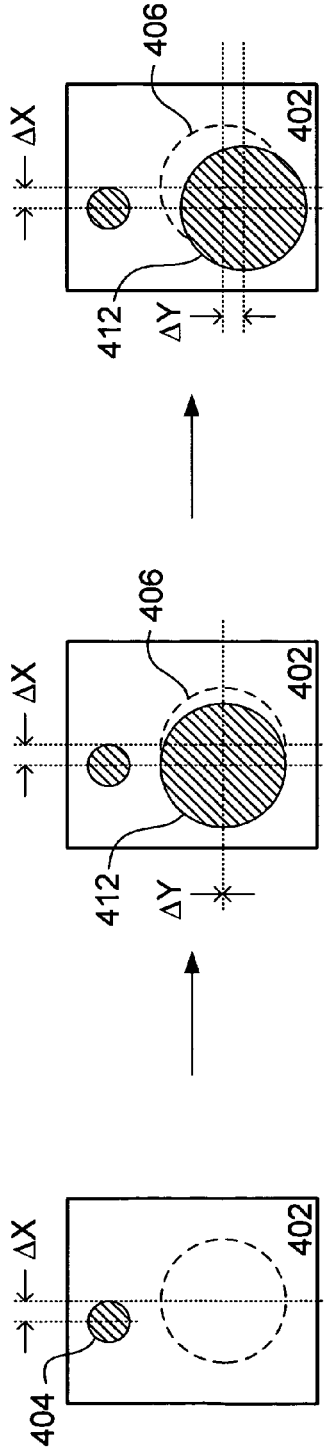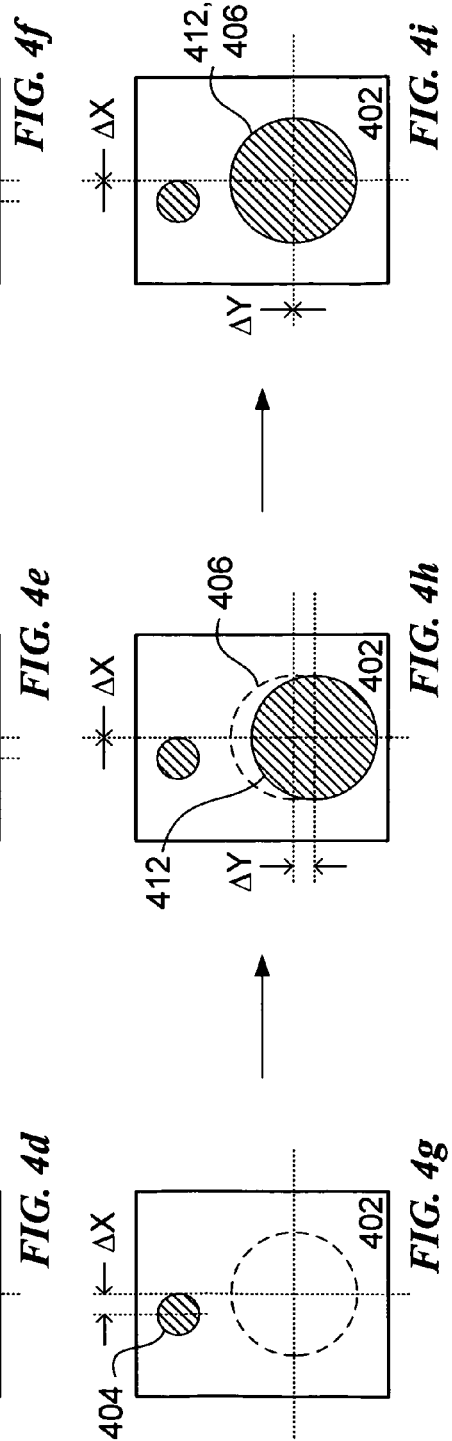

CLOSED-LOOP FEEDBACK FOR MAXIMIZING CPK IN PROGRESSIVE FORMING OPERATIONS

BACKGROUND OF THE INVENTION

1. Field of the Invention

This invention relates generally to control systems for use in an automated manufacturing process. More specifically, the invention relates to closed-loop feedback control for maximizing a process capability index in a progressive forming operation, especially for high-precision, high-volume applications.

2. Background

Process capability index, or Cpk, is a well-known statistical measurement used to indicate how well a process or products of the process conform to specifications. Mathematically, Cpk may be defined as the lesser result of two calculations: (1) Cpk=(USL−mean)/(3×sigma) and (2) Cpk=(mean−LSL)/(3×sigma); where USL and LSL are the upper and lower specification limits, respectively, and sigma is the standard deviation of some probability distribution within those limits. Generally speaking, given a target value within the specification limits, Cpk measures two qualities: product variation relative to a mean, and how closely the mean converges on the target. Cpk is often used as an indicator of product quality in statistical process control, sometimes as an alternative to sigma. Assuming a normal distribution of data resulting from a stable process, and a standard sigma shift of 1.5, a Cpk value of 2.00 is equivalent to the standard value of 6.00 sigma. Under these conditions, a rule of thumb in statistical process control is to maintain Cpk at or above 1.33 (i.e. 4.00 sigma), in order to ensure product conformance.

Statistical process controls employing Cpk can been applied, for example, to processes that use progressive tooling die for automated mass production of high-precision components. Typically, the progressive die consists of multiple forming stations, where each station is configured to perform one or many forming operations on incoming product. The forming operations may perform stamping, coining, cutting, punching, bending, welding, drilling, plating, or other tooling functions. A quantity of incoming or unformed product is fed serially into the process, and the various forming operations are carried out in sequence as the product advances from station to station. Some imperfections affecting Cpk may be present in the unformed product prior to processing, while others may be introduced by action of the forming stations. Variations introduced at a forming station may result from erratic component alignment or other imperfect tooling construction or operation. For small, high-precision components, environmental factors such as variations in temperature, humidity, and pressure may also contribute to lower Cpk. Other defects that adversely affect Cpk may be traced to random errors caused by control system transients or defects in raw material.

Conventional methods for forming precision features on small parts rely on highly precise tooling and guiding means to register incoming material to the form tooling. This is typically achieved by configuring unformed or partially formed components onto a fret at regular intervals. The fret is also configured with precision locating features, such as holes, that match precision tooling features, such as positioning pins, that are located on a feed mechanism or feed bar. Using these features, the feed mechanism holds and positions the fret as it incrementally advances past each forming station in the progressive die set. The accuracy of the final formed component is thus a function of the cumulative errors in the fret, in the positioning mechanism, and in the registration of each die position. Cumulative errors are particularly troublesome in high-precision forming operations, where tolerances are on the order of 100 microns or less.

When the number of forming stations required to produce the correct part geometry number more than one, establishing these stations in a correct relationship can be a costly and time-consuming calibration. This process of maintaining hard tooling typically requires manual internal setup of the forming stations. Inevitably, hard tooling leads to a loss of capacity whenever a station in the progressive die drifts out of tolerance, interrupting production until it can be re-calibrated, often by manual trial and error.

To have sufficient capacity to meet demand and to compensate for a production line being out of service, a manufacturer may establish multiple production lines for parallel manufacturing of a common component. However, this approach tends to decrease Cpk for the overall population of manufactured goods when goods from different production lines are commingled. FIG. 1 illustrates this phenomenon. Parallel production lines $L_1(1)$, $L_1(2)$, ... and $L_1(n)$ are each hard-tooled to produce, through respective forming processes 102, 104, 106, a relatively narrow distribution between LSL and USL, as indicated by the respective curves 108, 110, 112. Each of these distributions exhibits a Cpk value between 1.33 and 2.00. Note, however, the disparity among curves as to how closely each mean converges on its target T. In the aggregate, these curves combine to form curve 114, which represents a distribution of output from multiple production lines commingled into a single lot, for example, to satisfy a purchase order. Thus, the combined distribution curve 114, seen by the customer, exhibits a much wider distribution that may correspond to a Cpk below the customer's acceptance criteria.

As market forces continue to demand tighter tolerances for precision components, there is an ongoing need to sharpen process controls to maintain Cpk at acceptable levels.

SUMMARY

A method is presented for maximizing Cpk in a high volume forming operation. The method compensates for deviations introduced by unformed components, and uses closed loop feedback to compensate for deviations introduced by forming operations. In one embodiment, the method comprises detecting fiducial features on an incoming component, and calculating a first compensation value from displacement of the fiducial features from an ideal forming location on the component. The first compensation value is then used to adjust a position of the component with respect to a theoretical forming position. A feature is then formed on the component at the adjusted position, and after forming, placement of the feature formed on the component is detected and compared to the ideal forming location to obtain a difference value. A plurality of difference values collected from formed components is stored, and a second compensation value is derived for offsetting forming tool deviations. Forming positions for subsequent incoming components are then adjusted with respect to the theoretical forming position according to first and second compensation values.

In another embodiment, the method is employed in a progressive forming system comprising a plurality of forming stations. First compensation values are derived for each incoming component, and second compensation values are derived for each forming tool in the progression. In one implementation, the second compensation values are continually updated using an algorithm such as a moving window average. In another implementation, the method is embodied as a series of operating instructions in a processor readable medium accessible by a microprocessor for controlling the forming operation.

In another embodiment of the invention, a closed loop forming system comprises a loading station for loading an incoming component, an imaging subsystem for detecting a deviation on the component, a computer subsystem for calculating a first compensation value according to the deviation, a conveyor for moving the component to a position at a forming station, and a forming tool for forming a feature on the component. The conveyor adjusts the actual forming position from a theoretical forming position according to the first compensation value. The imaging subsystem detects placement of the feature formed on the component, the computer subsystem compares the placement to an ideal forming location to obtain a difference value, and the conveyor adjusts a position of a subsequent incoming component with respect to the theoretical forming position according to the difference value, and according to a first compensation value.

In another embodiment of the system, the computer subsystem stores a difference value for each component formed and using appropriate software, derives a second compensation value from the plurality of stored difference values. In another embodiment, the computer subsystem comprises a central controller for the system, and controls and coordinates loading, unloading, and positioning of components, actuation of each subsystem, data collection and storage, and execution of the compensation algorithms.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention.

FIGS. 4a–4i illustrate manufacturing deviations on a formed component, and effects thereof attributable to first and second compensation steps according to one embodiment of the present invention.

FIG. 8b illustrates additional optional steps for the method of FIG. 8a.

DETAILED DESCRIPTION

As utilized herein, it should be appreciated that terms such as "calculating", "selecting", "storing", "deriving", "detecting", "providing", "performing", "comparing", "extracting", "validating" and the like, refer to the action and process of a computer system or electronic processing device that transforms data that is stored within the computer system's memory or that is otherwise accessible by the computer system.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, PROM, EPROM, EEPROM, disk, floppy disk, hard disk, CD-ROM, DVD, flash memory, or the like, or any combination of two or more of the foregoing, which may store data accessible by a processor such as a series of software instructions executable by a processor.

The terms "processor" refers to any device capable of executing a series of instructions and includes, without limitation, a CPU, a general- or special-purpose microprocessor, a finite state machine, a controller, computer, digital signal processor (DSP), or the like.

The term "logic" refers to implementations in hardware, software, or combinations of hardware and software.

As used herein, the term "unformed component" refers to incoming material about to undergo processing within a system, or according to a method described herein. Thus, "unformed component" includes raw material as well as material that has been partially formed or pre-formed by another process. The other process may also embody an invention disclosed herein.

Figure 1:
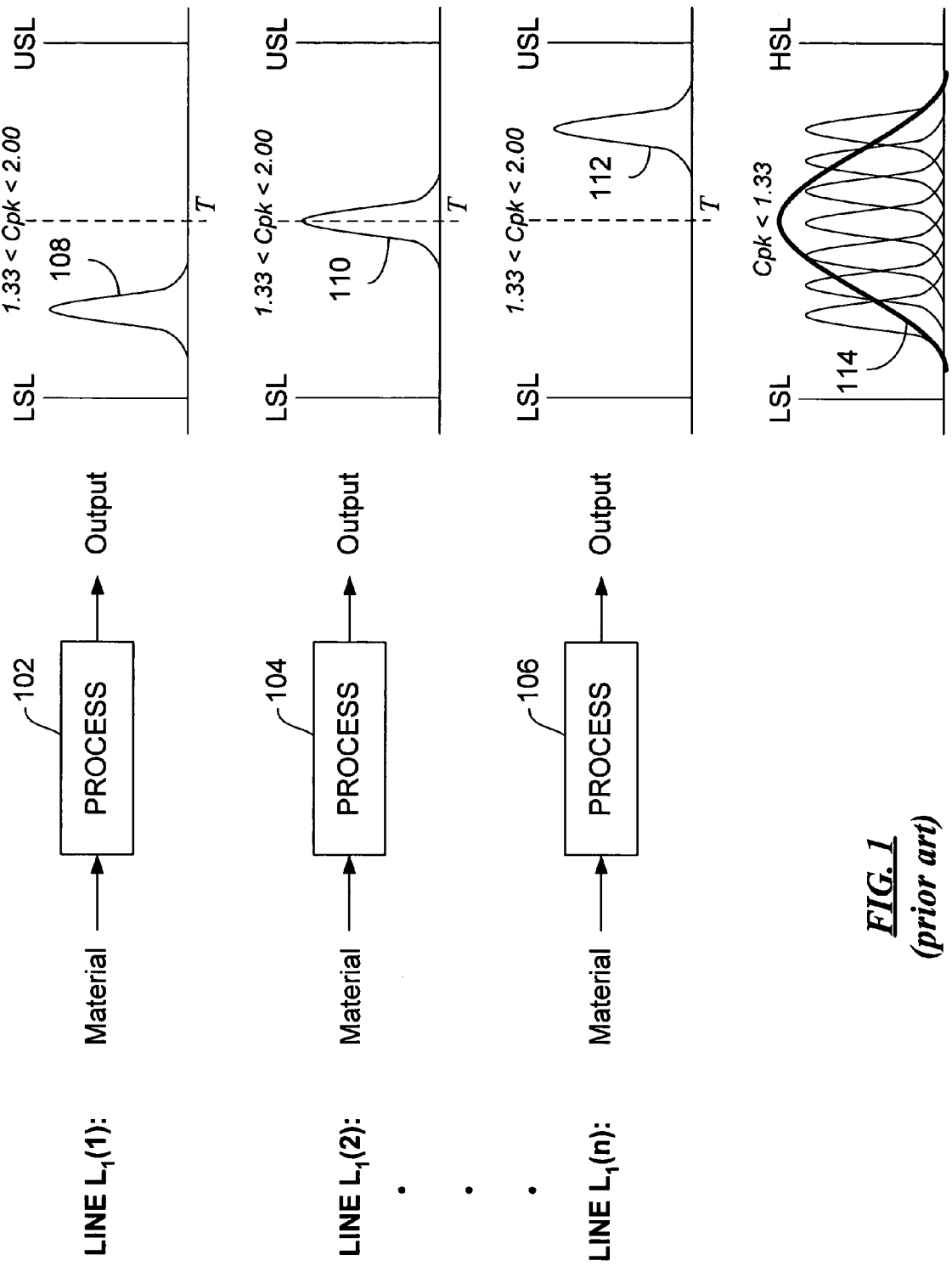
FIG. 1 illustrates parallel production line manufacturing, showing the commingling effect of production line process capabilities on overall Cpk.
Figure 2:
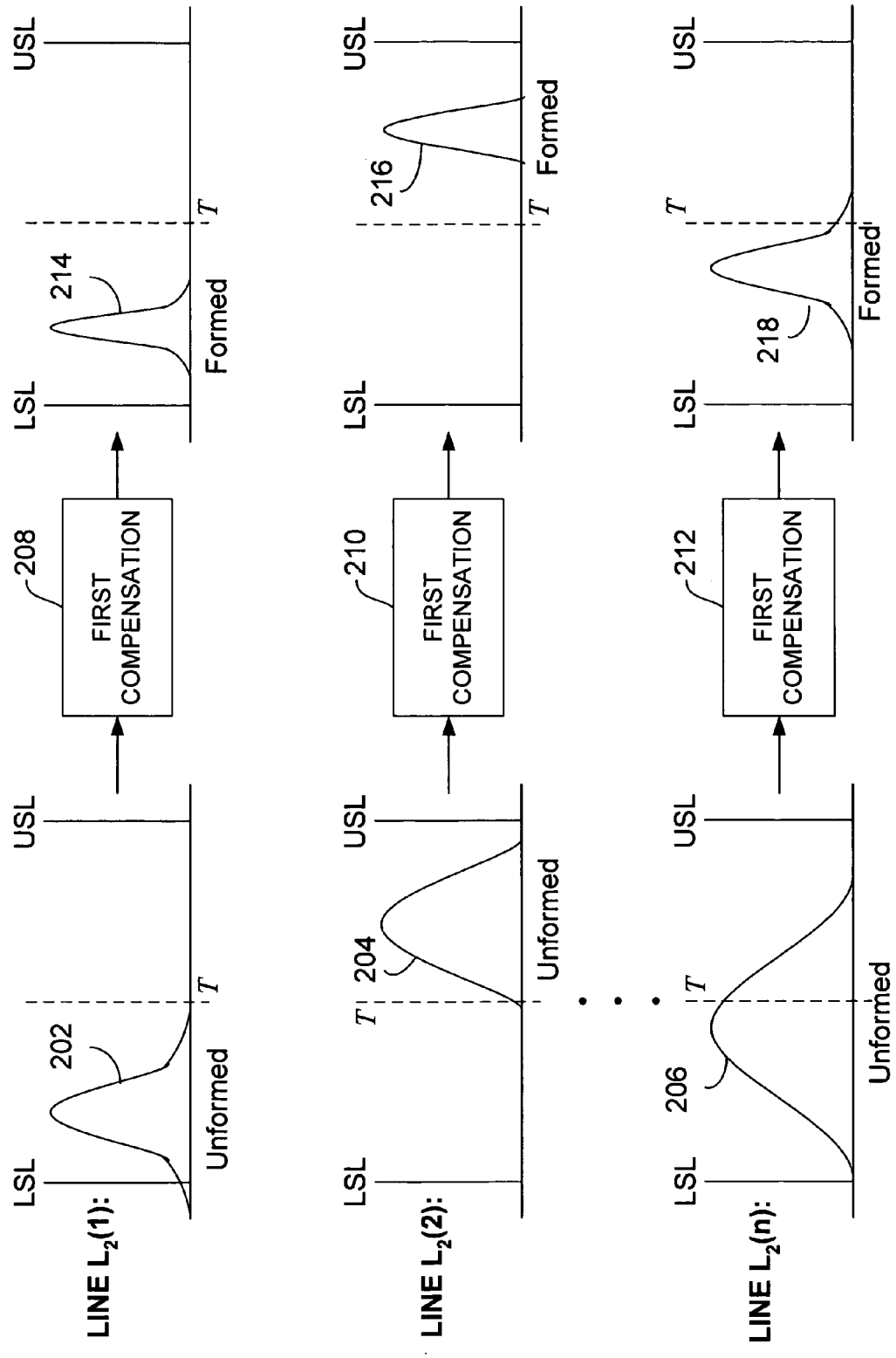
FIG. 2 shows the output effect on parallel production lines having a first compensation step implemented in a forming operation according to one embodiment of the invention.

FIG. 2 introduces the concept of a first compensation. A first compensation is a correction factor intended to minimize deviations introduced by unformed components. Almost without exception, these deviations comprise dimensional variations, such as a displacement from an ideal value in a horizontal, angular or vertical direction, or in a direction having one or more horizontal, angular and vertical components. For purposes of illustration, this disclosure is concerned primarily with forming operations performed on a two-dimensional object comprising an unformed, substantially planar component. However, skilled artisans should appreciate that the principles disclosed herein apply equally to forming operations performed in three dimensions. Moreover, these principles can be extended to correct for angular deviations, or deviations expressed in polar coordinates.

The objective of a first compensation is to reduce dimensional deviations introduced by incoming components to zero, or to at least substantially correct them. In practice, some degree of error, measurable or not, remains after the effect of a first compensation; however, a substantial correction tightens the output distribution as shown in FIG. 2. Parallel production lines $L_2(1)$, $L_2(2)$ ... $L_2(n)$ are each supplied with a volume of unformed components, each volume having a distribution curve 202, 204, 206, respectively. Each distribution curve represents, as a normal distribution about its mean, variations in a characteristic of interest. For example, the characteristic of interest may be a fiducial feature on the unformed component, such as a notch, formed at a specified location relative to center. A target value T, centered between the LSL and USL, represents the exact specification or desired value, which in this case represents a notch perfectly located. If each of these lots were to undergo a forming process, the accuracy of which is dependent in some way on the accuracy of the notch, each curve 202, 204, 206 would have its mean displaced either to the right or to the left of center, as shown. In this example, the notch is a fiducial feature that provides a target for aligning a forming tool for further processing of the unformed component. Thus, without a first compensation, the same general distribution curves would be reflected in each lot post-process, for any formed characteristic the formation of which depends on the accuracy of the fiducial feature.

During a first compensation process, illustrated generally in blocks 208, 210, and 212, the deviation of each notch location is detected by a detection means, and compensated for during the forming operation. For example, the compensation may consist of positioning the unformed component, responsive to the detection, relative to the forming tool at a distance that exactly (or as nearly exactly as practical) offsets the error otherwise caused by the notch deviation. After the forming operation, the effect of first compensation is seen in the distribution curves 214, 216, and 218 at the right hand side of the figure. In each of these curves, the distribution is more narrow, resulting in a higher Cpk for each production line. Note that there is no appreciable change in the mean centering of any of the curves; each mean center is still displaced from T at about the same distance as its corresponding unformed distribution curve.

Figure 3:
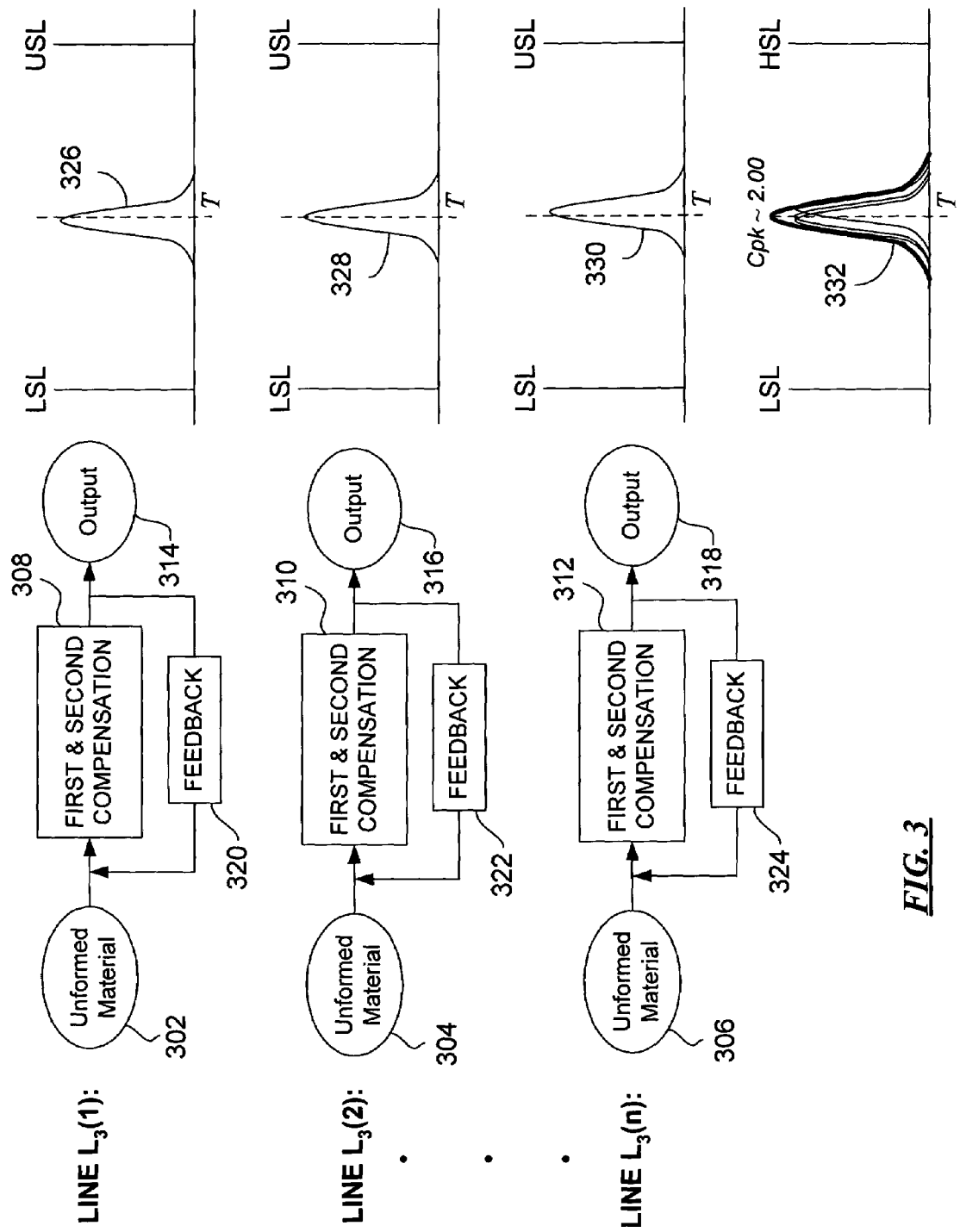
FIG. 3 shows the output effect on parallel production lines having first and second compensation steps implemented in a forming operation according to one embodiment of the invention.

FIG. 3 introduces the concepts of second compensation and closed loop forming. In FIG. 3, parallel production lines $L_3(1)$, $L_3(2)$ ... $L_3(n)$ are supplied with a volume of unformed material 302, 304, 306, respectively. In block 308, 310, and 312, a forming process employing first and second compensation occurs, and formed components are produced at the output 314, 316, and 318. During the forming process in block 308, 310, and 312, a first compensation step, similar to that described in the example of FIG. 2, is implemented for each unformed component entering the process. The first compensation step corrects for deviations introduced by the unformed components. The second compensation step corrects for deviations introduced by the forming operation itself. After each forming operation, a component just formed is inspected for forming operation deviations. As in the case of deviations attributable to unformed components, deviations introduced by a forming operation comprise dimensional variations, such as a displacement from an ideal value in a horizontal or vertical direction, or in a direction having both horizontal and vertical components. Once detected, the formed component deviation is quantified and fed back to the process input, as depicted in feedback blocks 320, 322, and 324. A subsequent incoming component to process 308, 310, 312 then undergoes first compensation to correct for any specific deviations, and also a second compensation to correct for any global deviations introduced by a forming operation. The second compensation factor corresponds to a forming station or forming tool, and may be derived from any number of deviations detected in formed components. Thus, it may be continually updated as each component is formed at the output to account for calibration drift. In this way, correction factors for second compensation are maintained through closed loop feedback from process output to process input.

By combining first and second compensation, deviations in formed product quickly converge toward zero. This can be seen in the distribution curves 326, 328, and 330 that correspond to production lines $L_3(1)$, $L_3(2)$, and $L_3(n)$. As in curves 214, 216 and 218, where only first compensation was employed, each of curves 326, 328, and 330 exhibits a relatively narrow distribution corresponding to higher Cpk. More significantly, however, is the mean centering effect of second compensation. The mean of each curve 326, 328, and 330 coincides, or nearly coincides, with the target value T. This results in an excellent overall Cpk for commingled product, as depicted in curve 332.

FIGS. 4a through 4i further illustrate the concepts of first and second compensations in accordance with the invention, and of the beneficial effects of employing them in a forming operation. In these figures, the dimensions are not drawn to scale, but are exaggerated to facilitate the disclosure. Also in these figures, for purposes of illustration only, unformed component deviations are restricted to the X dimension, and forming tool deviations are restricted to the Y direction.

FIG. 4a shows an unformed component 402 having a fiducial feature 404 and a theoretical forming location 406. In this example, fiducial feature 404 is a hole that has been stamped, etched, or drilled into planar component 402. Theoretical forming location 406 is a location specified for a hole to be formed during a forming operation by a forming tool (not shown). An alignment system (also not shown), is configured to align the forming tool, responsive to detecting fiducial feature 404, such that it centers the formed hole at theoretical forming location 406. The center of location 406 is indicated by the intersection of two imaginary lines—horizontal line 408 and vertical line 410. In FIG. 4a, fiducial feature 404 is perfectly aligned with no horizontal or vertical deviation.

FIG. 4b shows the result of an ideal forming operation, where neither component 402 nor the forming tool introduces a deviation. Thus, formed hole 412 coincides precisely with theoretical forming location 406, such that no deviation exists in component 402 after forming. Without second compensation, however, if a forming tool introduces a deviation during the forming action, a result such as that shown in FIG. 4c may occur. Here, a forming tool deviation causes formed hole 412 to deviate in a downward vertical direction from ideal forming location 406 by an amount $\Delta Y$.

In another example shown in FIG. 4d, unformed component 402 introduces a deviation through displacement of fiducial feature 404 by an amount $\Delta X$ from its desired location. In the absence of first compensation, FIG. 4e illustrates how this deviation gets transferred to component 402 after forming. The forming tool offsets formed hole 412 by the same, or nearly the same deviation $\Delta X$. In this example, the forming tool does not introduce a deviation in either the X or Y direction, thus, $\Delta Y$ is zero. However, in the example shown in FIG. 4f, the forming tool introduces a $\Delta Y$ deviation. In the absence of first and second compensation, the $\Delta Y$ deviation combines with the $\Delta X$ deviation, resulting in formed hole 412 offset from ideal forming location 406 in both the horizontal and vertical directions, as shown.

FIG. 4g shows another unformed component 402 having an unformed component deviation as a result of fiducial feature 404 offset from a desired location by an amount ΔX. FIG. 4h shows the result of employing first compensation to this component without also employing second compensation. Component 402 after forming compensates for the unformed component deviation (ΔX=0), but cannot compensate for forming tool deviation, resulting in displacement of formed hole 412 by an amount ΔY from ideal forming location 406.

FIG. 4i shows a component 402 after forming using a process employing both first and second compensation according to the invention, where both unformed component deviation and forming tool deviation were present during the process. Formed hole 412 is aligned with theoretical forming location 406, and both ΔX and ΔY are zero, or nearly zero.

In high-precision forming operations, such as those requiring tolerances in the range of 100 microns or less, deviations introduced by a single forming operation or a single forming tool may vary significantly from one operation to the next. Factors such as thermal drift, ambient pressure, mechanical wear, or even random transients may cause a particular forming tool to introduce deviations of varying degree, or deviations that vary with time. Therefore, the accuracy of correction provided by a second compensation value improves as the sample size of detected forming tool deviations increases. In practice, some time must be expended in hard tooling to initialize a forming operation. Once initialized, a number of forming operations must be performed to gather data from which an accurate second compensation value may be derived, before a process employing first and second compensation can return the maximum benefit.

Figure 5:
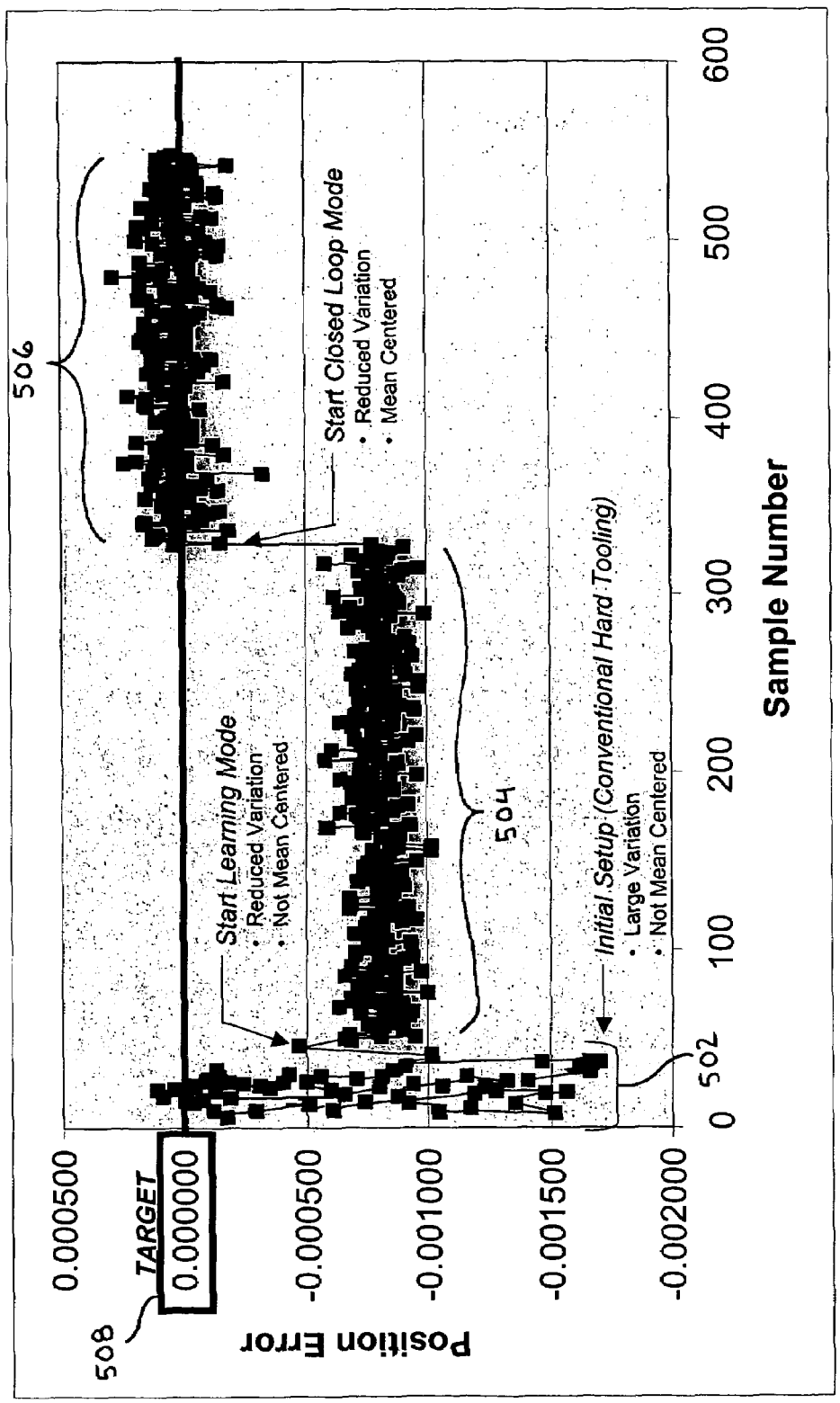
FIG. 5 illustrates three modes of a forming operation according to one embodiment of the present invention.

With reference now to FIG. 5, the accuracy of a forming process according to one embodiment of the invention is shown over several modes of operation. The first mode is mode 502, which comprises an initial setup phase. During this phase, forming tools are "hard tooled" by skilled technicians to calibrate operation to within an initial acceptance range. In the example of FIG. 5, a relatively large variation in error values (shown on the vertical axis) occurs. These errors vary between the target 508 (normalized to 0.00) and a value of about 0.0017 units as the equipment undergoes adjustment by trial and error. Once calibration is within an acceptable start-up range, the process enters the learning mode 504. In this mode, a forming operation according to the invention begins to employ a first compensation to incoming unformed components. Note that the variation in error values lessens to a range of about 0.0005 units, and that the distribution is not mean-centered about target 508. Also in this mode, the system begins to detect forming tool deviations and to store data that quantifies each deviation. When a sufficient amount of data has been collected, an algorithm is run using the stored data as input to produce a second compensation value. In the example of FIG. 5, about 300 samples are required before the algorithm executes. From this point forward, the forming operation enters closed loop mode 506. In closed loop mode 506, the process employs first and second compensation to maintain the narrow range of error distribution (0.0005), and to mean-center the distribution about the target 508.

It should be appreciated that an algorithm for calculating a second compensation value may take on a variety of forms. Accordingly, the number of samples required to produce an initial second compensation value may also vary. In one example, the algorithm may comprise a simple averaging of samples. In another example, the algorithm may comprise a weighted average, where samples taken during one time span are weighted more heavily than samples taken during another time span. In other example algorithms, samples may be taken randomly, periodically, non-periodically, etc., or the sampling frequency may vary according to the value of detected deviations. In another embodiment, the algorithm uses a moving window average, wherein a fixed number of samples comprise the sample size, and wherein samples are discarded (and replenished) after a fixed time has elapsed from the time of sampling. Skilled artisans will recognize that many more algorithms are possible, including algorithms employing more advanced DSP techniques that are well known in the art.

Figure 6:
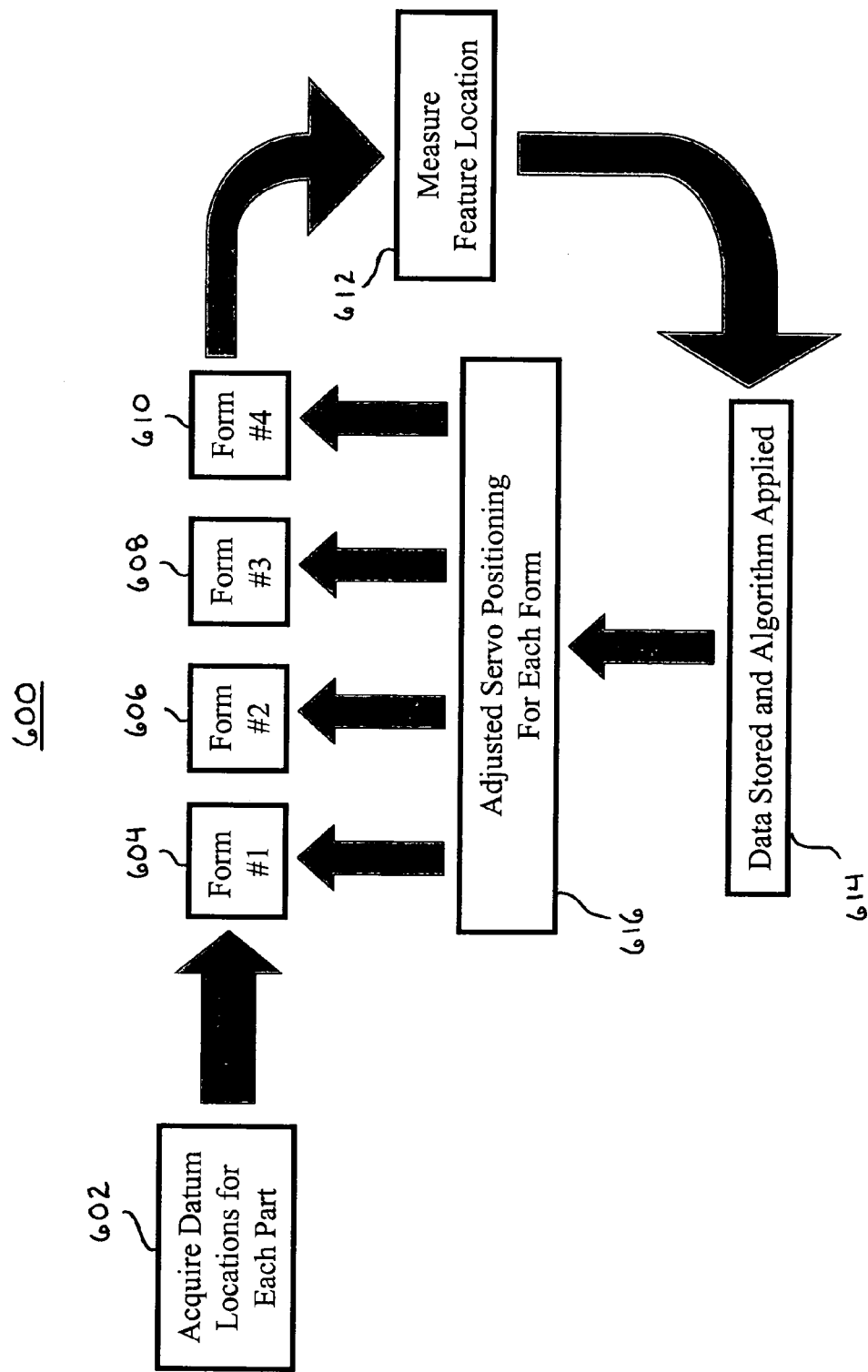
FIG. 6 illustrates basic steps in a forming process according to one embodiment of the present invention.

FIG. 6 illustrates basic steps in a progressive forming operation 600 according to another embodiment of the invention. The process starts at step 602, which comprises acquiring datum locations for each unformed component. Acquiring datum locations may comprise detecting one or more fiducial features on the component, and/or detecting one or more geometric features. In one implementation, the one or more features are detected using a machine vision system. In another implementation, the machine vision system comprises a computer system coupled to an imaging system and executing a pattern recognition software. This detection process enables a first compensation value to be derived based on the displacement of the one or more fiducial features from an ideal forming location on the component.

The process continues through a progression of steps 604, 606, 608 and 610. Each of these steps represents a forming station equipped with a forming tool for performing one or more forming operations on the incoming component. At each forming station, a servo positioning process, represented by step 616, adjusts a position of the incoming component with respect to a theoretical forming position. Each adjustment is a function of first and second compensation values associated, respectively, with the incoming component and with the forming tool at which the incoming component is being positioned. These compensation values are stored and applied to an adjustment algorithm modeled as step 614. After each adjustment, each respective forming step 604, 606, 608 and 610 performs a forming operation. Then, at step 612, a measurement is performed on each newly formed component to measure deviations in placement of a formed feature from an ideal forming location. These deviations are stored as data and fed into the algorithm of step 614 for updating the second compensation values.

In another variation, the measurement process embodied as block 612 may be performed after each forming process. For example, after a forming operation is carried out at the forming station associated with block 604, a measurement associated with block 612 is performed. Then the component is repositioned for the next forming operation associated with block 606, another forming operation is performed, then another measurement is performed, and so on. This variation is useful where a forming operation would obscure a forming tool deviation introduced at a previous forming station.

Figure 7:
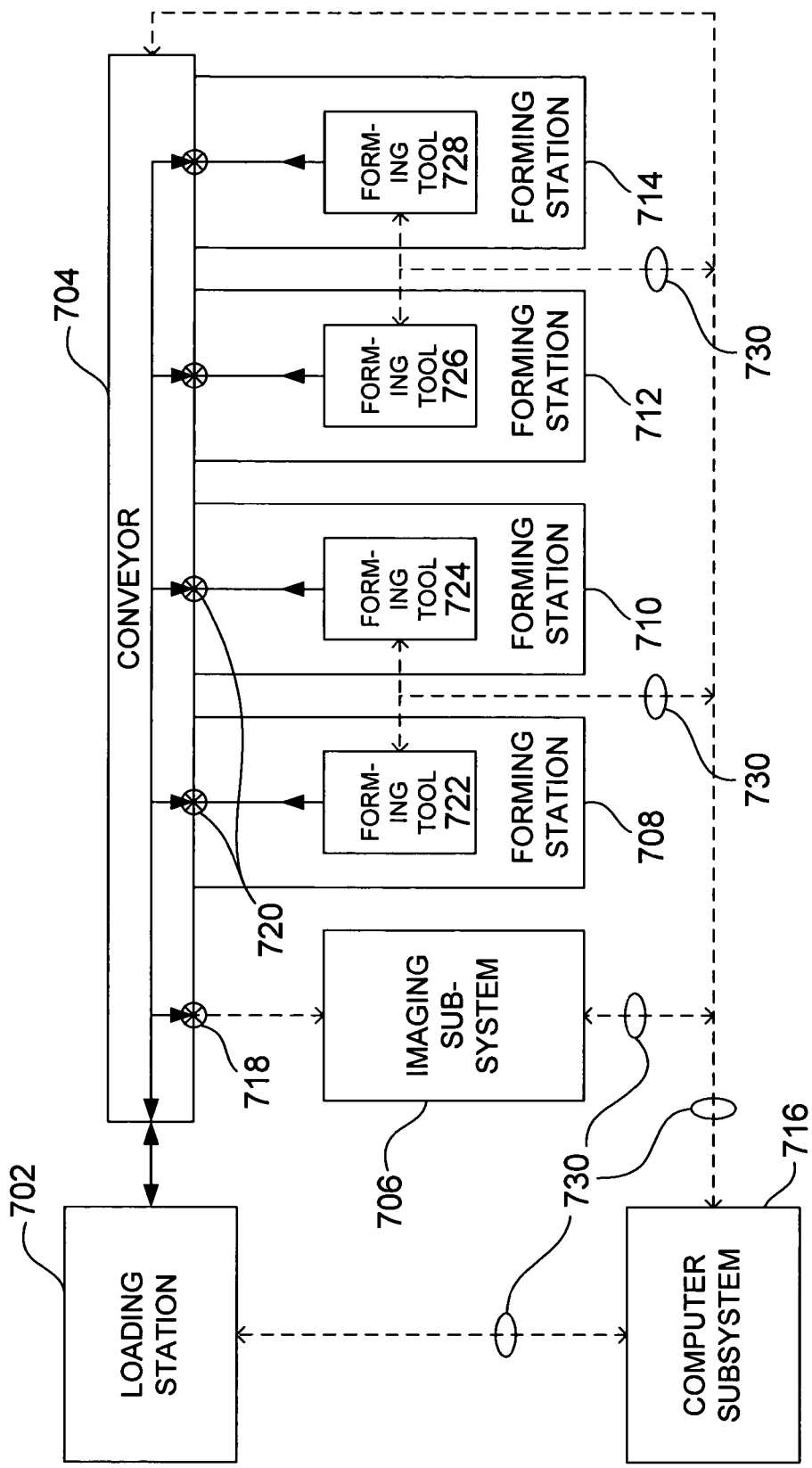
FIG. 7 is a block diagram showing basic components of a progressive closed loop forming system according to one embodiment of the present invention.

FIG. 7 is a block diagram showing basic components of a progressive closed loop forming system 700 according to one embodiment of the present invention. A loading station 702 is provided for loading unformed components. In another aspect, loading station 702 may be employed for unloading outgoing components. In one example, loading station 702 may be configured for sequential loading and unloading of components partially formed on an etched fret. In another example, loading station 702 comprises an automated subsystem actuated by servo motors. Unformed components are loaded by loading station 702 onto conveyor 704 for progressive forming. Conveyor 704 moves components, formed or unformed, between an imaging subsystem 706, and a plurality of forming stations 708, 710, 712 and 714. Conveyor 704 may also comprise an automated system actuated by servo motors. In one embodiment, conveyor 704 comprises a linear motor. In another embodiment, conveyor 704 comprises a hydraulic actuator.

Prior to forming, an unformed component loaded by loading station 702 and transferred thereby to conveyor 704 is positioned at an imaging position 718. Imaging subsystem 706 images the component at imaging position 718 to detect one or more fiducial features n the component. Imaging subsystem 706 may comprise a machine vision system or a digital camera known in the art and suitable for the purpose of resolving to a desired degree of accuracy the fiducial features present on the unformed component. Imaging subsystem 706 is coupled to a computer subsystem 716.

Computer subsystem 716 in its most basic sense comprises a processor coupled to memory. In a preferred embodiment, computer 716 may comprise any of various commercially available personal computer systems running any of various operating systems such as DOS, Windows, Unix, OS/2, etc. Computer 716 may also comprise pattern recognition software for analyzing images from imaging subsystem 706, or the software may be included within imaging subsystem 706. By means of the pattern recognition software and input from imaging subsystem 706, computer 716 locates the one or more fiducial features on the unformed component and compares their locations to an ideal forming location. The comparison may be performed using another software algorithm executable by computer 716. The ideal forming location is provided as a manufacturing specification. The result of the comparison yields a value representing a displacement of one or more fiducial features from the ideal forming location. This value is calculated by computer 716 and stored in memory accessible thereby as a first compensation value.

After the first compensation value is acquired, conveyor 704 moves the component sequentially through the forming stations 708, 710, 712, and 714. Conveyor 704 is configured to move the component to a forming position at each forming station. A theoretical forming position 720 exists for each forming station 708, 710, 712, and 714. Theoretical forming position 720 is the position, with respect to the forming tool, at which a component introducing no unformed component deviations would be perfectly formed at its ideal forming location by a forming tool introducing no forming tool deviations. In other words, forming position 720 is a position of perfect alignment for an errorless forming process. In practice, however, since there is usually a compensation value to be applied during the forming process, conveyor 704 moves an unformed component to a forming position near position 720, but adjusted from position 720 according to first and/or second compensation values.

When the unformed component is held at the adjusted position at a forming station 708, 710, 712, or 714, the forming tool 722, 724, 726, or 728 corresponding to the forming station is actuated to form a feature on the component. Forming tools 722, 724, 726, 728 may be any conventional tool known in the art, such as those configured for stamping, coining, cutting, punching, bending, welding, drilling, plating, or performing similar tooling functions on a formable material such as wood, metal, glass, plastic, etc. In one embodiment, actuation of the forming tool comprises computer 716 sending a control signal to the forming station or to the forming tool itself. In another embodiment, an actuation system for a forming tool comprises one or more linear motors. In another embodiment, the actuation system comprises a hydraulic system. In another embodiment, the actuation system comprises a combination of hydraulic and servo-controlled apparatus.

After the forming operation is performed by a forming tool 722, 724, 726, or 728, conveyor 704 repositions the just-formed component at position 718 for further inspection. At position 718, imaging subsystem 706 detects placement of the feature just formed on the component, and computer 716 compares the placement to an ideal forming location to obtain a difference value. This difference value represents a value for forming tool deviation, and in one embodiment, may itself comprise a second compensation value. In another embodiment, the difference value is stored in processor readable memory by computer 716. Computer 716 may then calculate a second compensation value based on the value just stored, and on other stored difference values derived from deviations committed by the same forming tool, as previously described in the discussion pertaining to the embodiment of FIG. 5.

In one implementation, computer subsystem 716 comprises a central control system for system 700. In this embodiment, computer 716 is electrically coupled by one or more signal lines or data busses 730 to each of the subsystems: loading station 702, conveyor 704, imaging subsystem 706, forming stations 708, 710, 712, 714, and/or forming tools 722, 724, 726, 728. Computer 716 thereby controls and coordinates loading, unloading, and positioning of components, actuation of each subsystem, data collection and storage, and execution of the compensation algorithms. In another embodiment, computer 716 further comprises a user interface and display system.

One application for the aforedescribed systems and methods lies in forming high-precision components having manufacturing tolerances on the order of 10 to 100 microns. In one such system according to the invention, loading station 702 may comprise one or more pneumatic driven apparatus configured with vacuum chuck capability for pickup and placement of components. Conveyor 704 and/or one or more forming stations 708, 710, 712, 714 may comprise an ATS100 or ALS1000 series direct drive linear motor manufactured by Aerotech, Inc. of Pittsburgh, Pa. ("Aerotech"), for effecting movement of incoming components along an X-axis. In one implementation, the X-axis actuator may be configured for up to 750 mm travel. One or more forming stations 708, 710, 712, 714 may further comprise an Aerotech ALS130 series direct drive linear motor for high accuracy alignment of components along a Y-axis. In one implementation, the Y-axis actuator may be configured for up to 25 mm travel. One or more of these stations may also comprise an Aerotech Wafermax direct drive rotary positioner for up to 4 mm travel along a Z-axis. Forming tools 722, 724, 726, 728 may comprise a 4-station forming cell configured with servo press actuators such as those manufactured by Automation Tooling Systems of Cambridge, ON, Canada. These tools, or their corresponding forming stations, may be further configured with appropriate load cells and/or pressure transducers in a control loop using techniques that are well known in the art. Imaging subsystem 706 may comprise an MVS-8000 series machine vision system manufactured by Cognex Corp. of Natick, Mass. ("Cognex"). In one implementation, subsystem 706 includes a digital camera having a 6.0 um pixel size, 2000×2000 pixels, and 2× magnification. Further, imaging subsystem 706 and/or computer subsystem 716 may include Cognex VisionPro software, and computer subsystem 716 may include Aerotech Automation 3200 series motion control software.

Figure 8A:
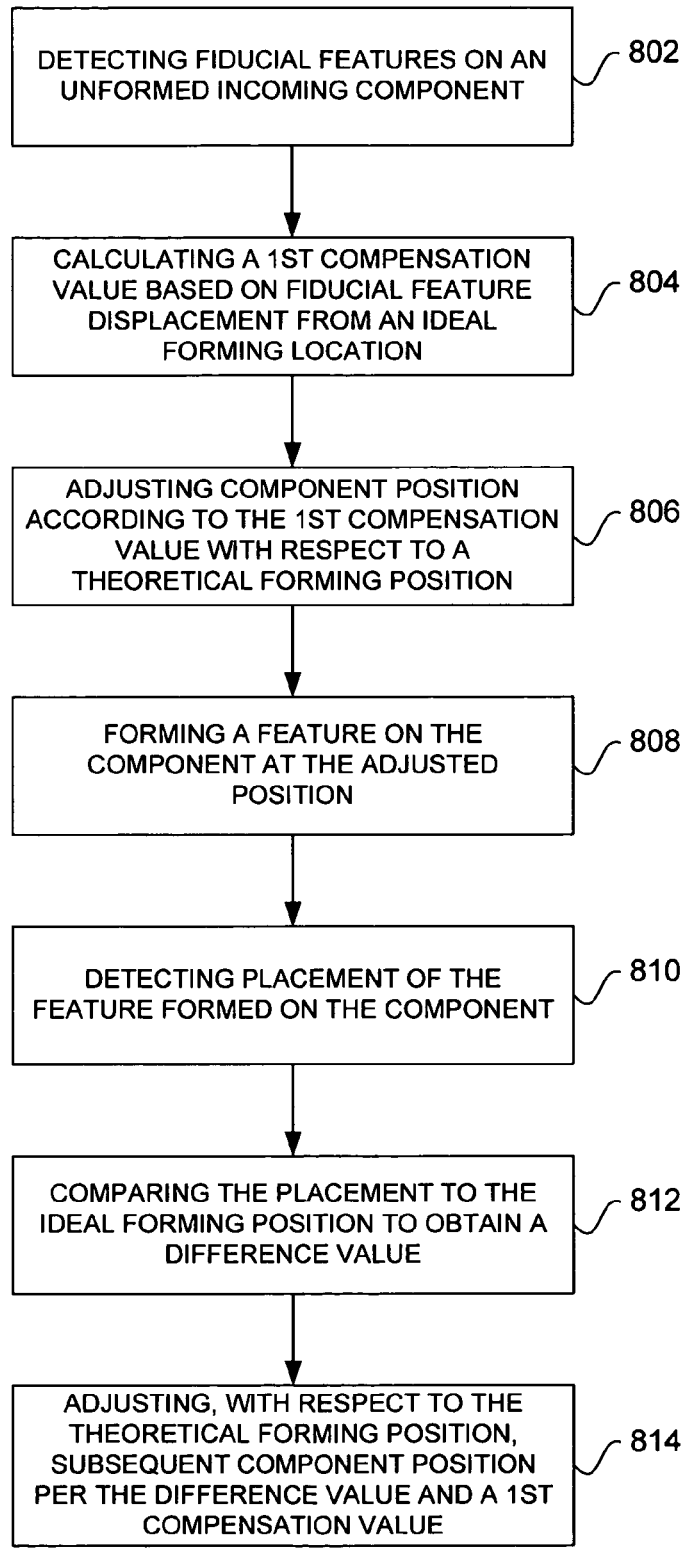
FIG. 8a illustrates one embodiment of a method according to the invention.

FIG. 8*a* illustrates an embodiment of a method 800 according to the invention for maximizing Cpk in a forming system. The method begins at step 802, which comprises detecting one or more fiducial features on an incoming, unformed component. The one or more fiducial features may comprise a geometric feature of the unformed component, or a feature previously stamped or etched thereon, or another feature detectable by a machine vision system using a pattern recognition technique. The next step 804 comprises calculating a first compensation value based on a deviation or displacement of a detected fiducial feature from an ideal forming location. This calculation may be performed by a computer executing an algorithm responsive to input from the machine vision or imaging subsystem and/or control signal directives from a control system algorithm. In the next step 806, the position of the incoming component is adjusted with respect to a theoretical forming position at a forming station. In a preferred embodiment, a conveyor system, translation mechanism, or servo controlled positioner, acting in response to a control signal directive, may be used to carry out this step. The adjustment of the component with respect to the theoretical forming position corrects for a deviation detected in step 804. In one implementation, the adjustment is proportional to the first compensation value.

The next step 808 comprises forming a feature on the component. During this step, a forming tool is actuated to form a physical feature on the component. Step 810 follows step 808. Step 810 comprises detecting placement of the feature just formed. Detection may be carried out in a manner similar to the detection process of step 802. Or, in another embodiment, a separate imaging or detection subsystem, such as a proximity sensor employing a laser, may be employed for this step. In the next step 812, the placement of the feature just formed is evaluated for placement accuracy. This step may be performed by comparing the placement to an ideal forming location using a computer coupled to a detection subsystem and executing appropriate software. Any deviation introduced at the forming station, or by the forming tool, may then be quantified as a difference value. Then, the final step 814 is performed on a subsequent incoming component. This step comprises adjusting a position of that component with respect to a theoretical forming position according to the difference value, and also according to a first compensation value associated with the incoming component. Deviations in subsequently formed components are thereby offset, resulting in higher overall Cpk.

Figure 8B:
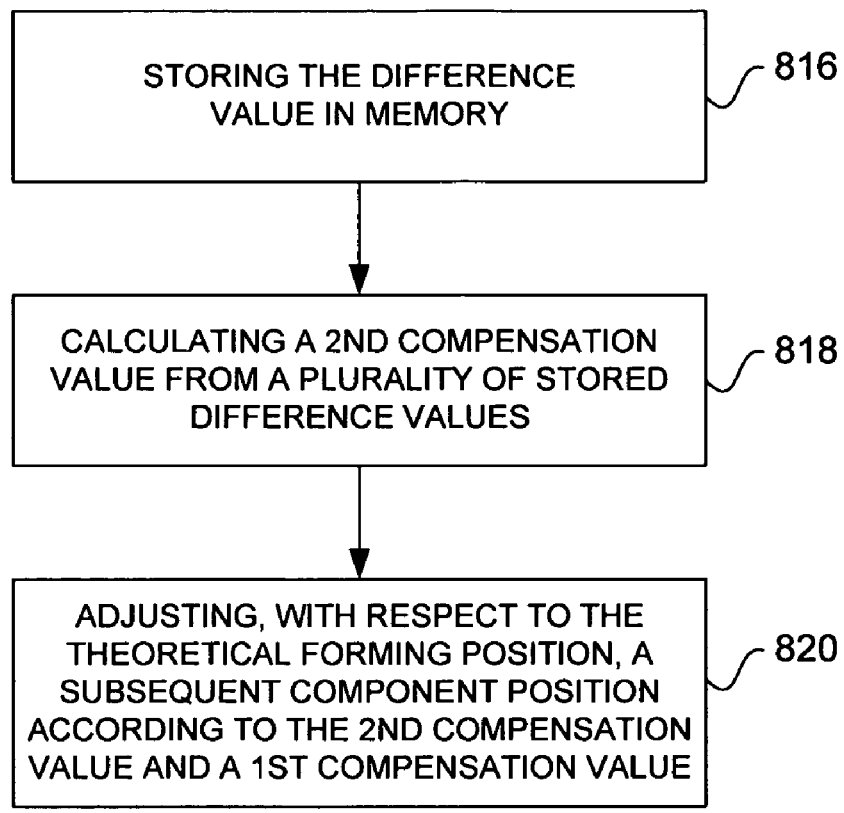

FIG. 8*b* shows an alternative embodiment 801 comprising three optional steps for method 800. Alternative method 801 comprises all of the steps of method 800, except that step 814 is replaced by steps 816, 818, and 820. In step 816, the difference value acquired in step 812 is stored in a processor readable memory. Then, in step 818, a second compensation value is calculated from a plurality of stored difference values. In one embodiment, the stored difference values are all associated with the same forming operation. In another embodiment, the stored difference values are all associated with the same forming tool. In the final step 820, the forming position of a subsequent incoming component is adjusted with respect to a theoretical forming position according to the second compensation value derived in the previous step, and according to a first compensation value obtained for the incoming component.

Figure 9:
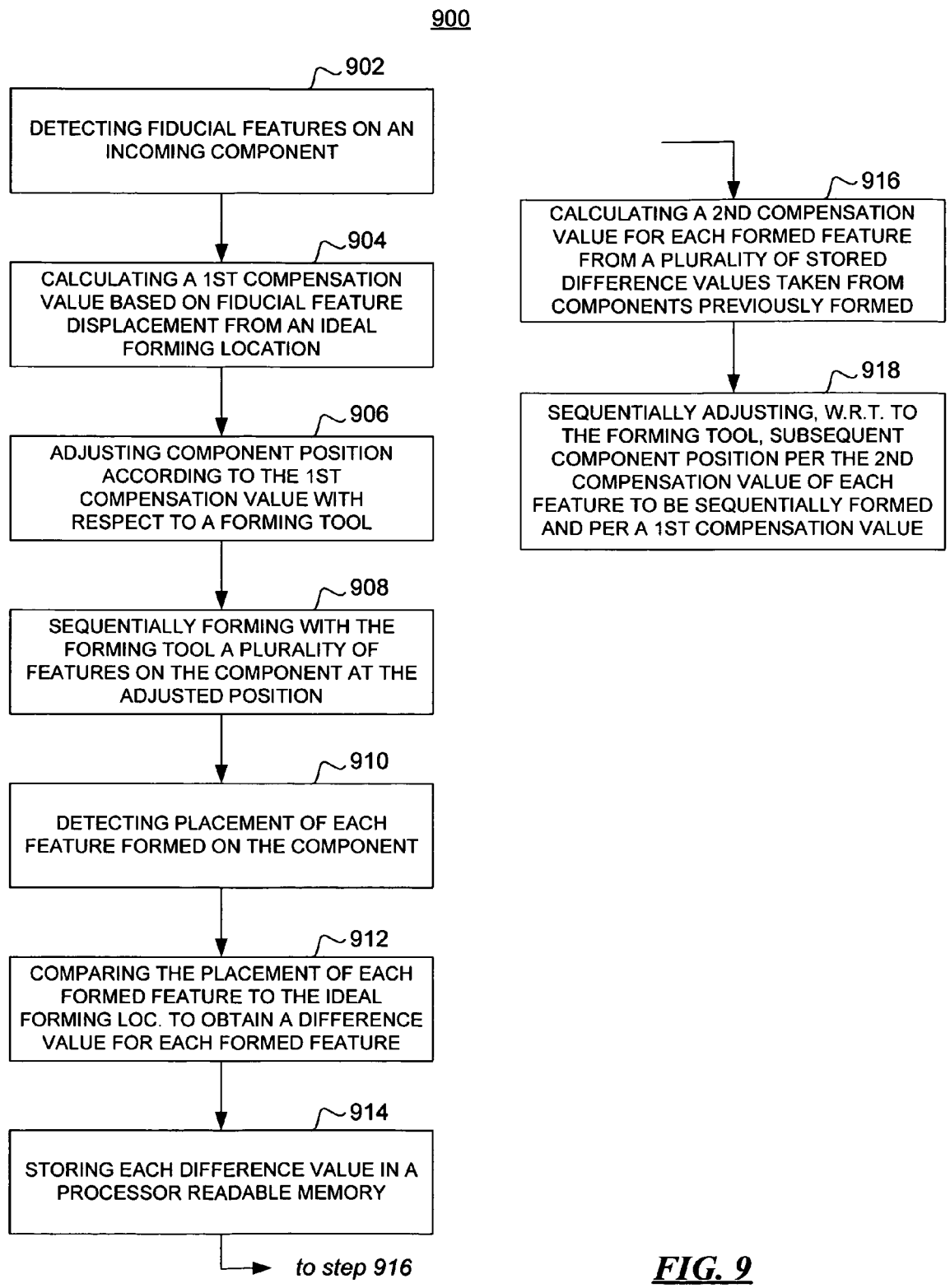
FIG. 9 illustrates another embodiment of a method according to the invention for closed loop progressive forming.

FIG. 9 illustrates method 900, another embodiment of a method according to the invention. In this embodiment, the closed loop forming process is applied in a system wherein a single forming tool may perform different forming operations on the same incoming component. The first three steps of this method—steps 902, 904, and 906—are identical to steps 802, 804, and 806 previously described for method 800. The fourth step 908 comprises several steps, in that within step 908, a single forming tool sequentially performs forming operations on a single unformed component that has been adjusted according to a first compensation value. In one embodiment, the adjustment is performed after each forming operation within step 908. In another embodiment, a single initial adjustment is performed for the duration of step 908. Next, in step 910, placement of each feature formed in step 908 is detected by a machine vision system or other detecting means. In the next step 912, the placement of each formed feature is compared to an ideal forming location, and a difference value is obtained for each forming operation that was performed in step 908.

The final three steps are similar to the steps of method 801. In step 914, each difference value is stored in a processor readable memory. In step 916, a second compensation value is calculated for each forming operation, where the input to the calculation algorithm is a plurality of stored difference values taken from components previously formed. In one embodiment, the plurality of stored values must be derived from action of the forming tool for which the corresponding second compensation value is associated. Finally, in step 918, the position of subsequent incoming components are sequentially adjusted with respect to the ideal forming location for each forming operation to be performed by the forming tool. Each adjustment comprises a second compensation value associated with the forming operation, and a first compensation associated with the subsequent incoming component.

Figure 10:
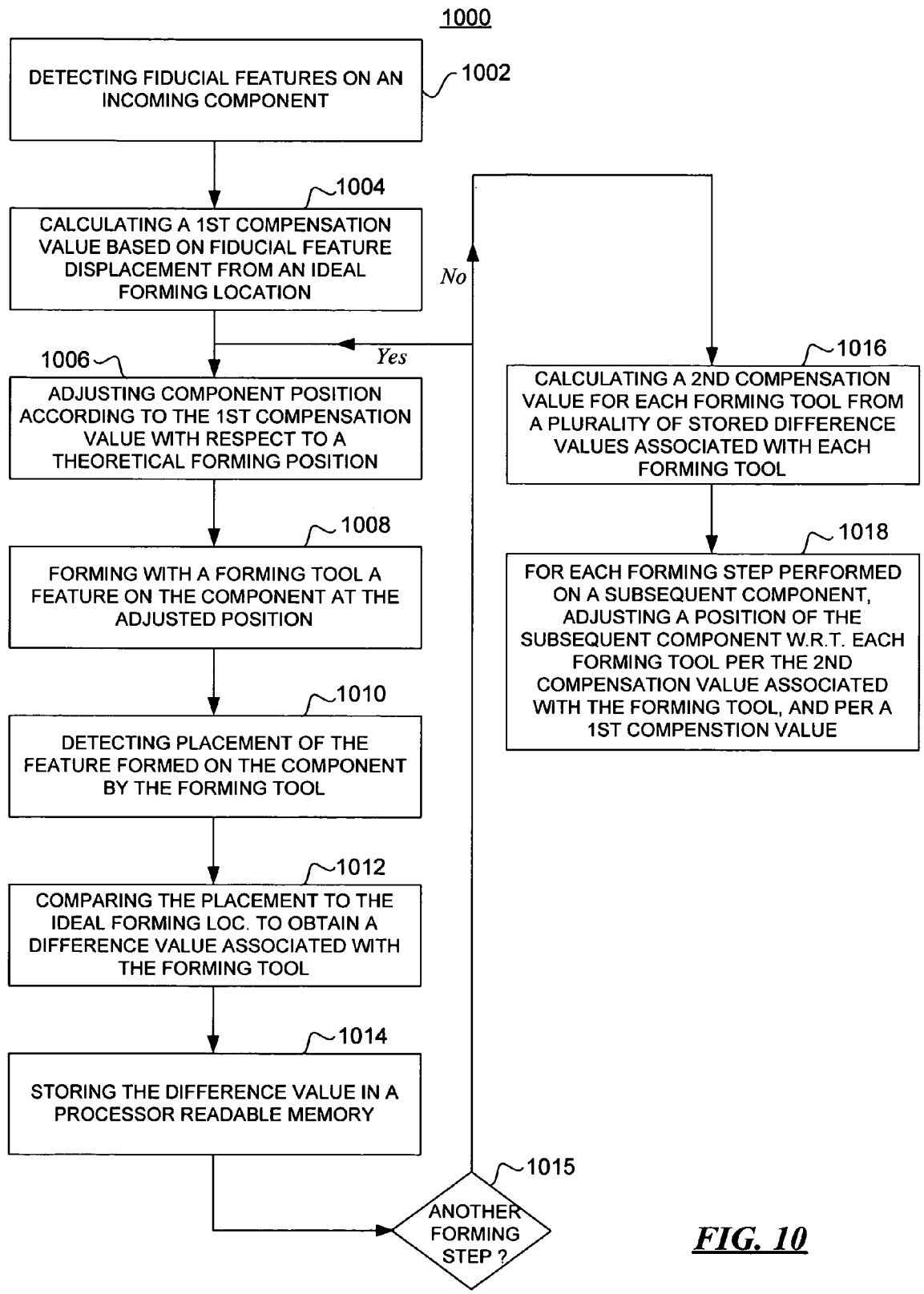
FIG. 10 illustrates another embodiment of a method according to the invention for closed loop progressive forming.

FIG. 10 depicts a method 1000 according to the invention for minimizing product defects introduced by unformed components and/or forming tool errors. Method 1000 may be executed using a progressive forming system having a progression of forming steps, performed by one or more forming tools, where each forming tool may perform one or more of the steps. The method begins at step 1002, in which one or more fiducial features on an incoming, unformed component are detected. This step is identical to steps 802 and 902 described in foregoing embodiments. The next step 1004 comprises calculating a first compensation value based on a deviation or displacement of a detected fiducial feature from an ideal forming location. As in previous embodiments, the calculation may be performed by a computer subsystem executing an algorithm responsive to input from an imaging or machine vision subsystem and control signal directives from the computer. In the next step 1006, the position of the incoming component is adjusted with respect to a theoretical forming position at a forming station. In a preferred embodiment, a conveyor system, translation mechanism, or servo controlled positioner, acting in response to a control signal directive, may be used to carry out this step. As in previous embodiments, the adjustment of the component with respect to the theoretical forming position corrects for a deviation detected in the previous step. In one implementation, the adjustment is proportional to the first compensation value.

The actual forming process occurs next in step 1008. With the unformed component now positioned at the forming station, and its position adjusted by an offset to account for component deviation, the forming tool is actuated to form a physical feature on the component. The next step, 1010, comprises detecting placement of the feature just formed, as described above in steps 810 and 910. In the next step 1012, the placement of the feature just formed is evaluated for placement accuracy. This may be performed, for example, by comparing the placement to an ideal forming location using a computer coupled to a machine vision system and executing appropriate software. Any deviation introduced at the forming station, or by the forming tool, is thereby quantified, for example, as a difference value. Then, in step 1014, the difference value representing this deviation is stored in a processor readable memory. The method then moves on to step 1015.

Step 1015 is a decision step, modeled as a decision block in method 1000. If, at this particular stage of the forming process, another forming step is required, then the method loops back to step 1006, and the method proceeds from that step forward. Another required forming step may be a duplicate of the step just performed, or it may be a different forming step to be performed at the same forming station by the same forming tool, or at the same forming station by a different forming tool, or it may be a step performed at another forming station. If, however, there are no additional forming steps to be performed, the method moves forward to step 1016. In step 1016, one or more second compensation values are calculated, one for each forming tool, using a plurality of stored difference values that have accumulated as a result of having previously formed a volume of components. A plurality of difference values used to calculate a particular second compensation value comprises only values associated with a particular forming tool. In other embodiments, step 1016 may be performed prior to, or substantially simultaneously with the decision step 1015.

The final step is step 1018. This step is implemented to update the global correction factor for subsequently formed components. For each forming step performed on a subsequent incoming component, a position of that component is adjusted with respect to each forming tool that is to operate on the incoming component. Its position is adjusted at each forming station according to the updated second compensation value for the forming tool, in addition to the first compensation value adjustment associated with the incoming component.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for maximizing process capability in a progressive forming operation, comprising:
   detecting fiducial features on an incoming component;
   calculating a first compensation value from displacement of one or more of the fiducial features from an ideal forming location;
   adjusting, according to the first compensation value, a position of the component with respect to a theoretical forming position;
   forming a feature on the component at the adjusted position;
   detecting placement of the feature formed on the component;
   comparing the placement to the ideal forming location to obtain a difference value;
   adjusting, according to the difference value, and according to a first compensation value, a position of a subsequent incoming component with respect to the theoretical forming position.

2. The method of claim 1 wherein the first detecting step comprises detecting the one or more fiducial features using a machine vision system.

3. The method of claim 1 wherein the one or more fiducial features include at least one geometric feature.

4. The method of claim 3 wherein the geometric feature is photo-chemically etched on the incoming component.

5. The method of claim 3 wherein the geometric feature is stamped on the incoming component.

6. The method of claim 1 wherein the calculating step is tangibly embodied as software embedded on a processor readable medium.

7. The method of claim 1 wherein the comparing step is tangibly embodied as software embedded on a processor readable medium.

8. The method of claim 1 wherein the first adjusting step comprises adjusting a two-dimensional position.

9. The method of claim 1 wherein the second adjusting step comprises adjusting a two-dimensional position.

10. The method of claim 1 wherein the forming step comprises forming a plurality of features on the component at the adjusted position, wherein subsequent detecting and comparing steps are performed to obtain a difference value for each of the formed features, and wherein subsequent adjusting steps reposition a subsequently incoming component for each feature to be formed.

11. The method of claim 1 wherein the second adjusting step comprises:
    storing the difference value;
    calculating a second compensation value from a plurality of stored difference values; and
    adjusting, according to the second compensation value, a position of a subsequent incoming component with respect to the theoretical forming position.

12. The method of claim 11 wherein the second compensation value represents an average of the plurality of stored difference values.

13. The method of claim 12 wherein the average comprises a moving window average.

14. The method of claim 12 wherein the average comprises a weighted average.

15. The method of claim 11 wherein the plurality of stored difference values are consecutive values.

16. The method of claim 11 wherein the plurality of stored difference values are non-consecutive values.

17. The method of claim 11 wherein the plurality of stored difference values comprise sampled values.

18. The method of claim 17 wherein the sampled values are obtained by random sampling.

19. The method of claim 17 wherein the sampled values are obtained by periodic sampling.

20. The method of claim 17 wherein the sampled values are obtained by non-periodic sampling.

21. The method of claim 1 embodied as a series of operating instructions in a processor readable medium accessible by a microprocessor for controlling the forming operation.

22. In a progressive forming system, a method for minimizing formed product deviations introduced by a combination of unformed component deviation and forming tool performance deviation, comprising:

detecting fiducial features on an unformed incoming component;

calculating a first compensation value from displacement of one or more of the fiducial features from an ideal forming location;

adjusting, according to the first compensation value, a position of the component with respect to a forming tool;

forming by means of the forming tool a feature on the component at the adjusted position;

detecting placement of the feature formed on the component;

comparing the placement to the ideal forming location to obtain a difference value;

storing the difference value in a processor-readable memory;

calculating a second compensation value from a plurality of stored difference values obtained from other components previously formed by the forming tool; and adjusting, according to the second compensation value, and according to a first compensation value, a position of a subsequent incoming component with respect to the forming tool.

23. The method of claim 22 wherein the first detecting step comprises detecting the one or more fiducial features using a machine vision system.

24. The method of claim 23 wherein the machine vision system comprises a digital imaging system and pattern recognition software.

25. The method of claim 22 wherein the calculating, comparing, and storing steps are tangibly embodied as a series of instructions embedded on a processor readable medium.

26. The method of claim 22 wherein each adjusting step comprises adjusting a two-dimensional position.

27. The method of claim 22 wherein each adjusting step comprises adjusting a three-dimensional position.

28. The method of claim 22 wherein the second compensation value represents an average of the plurality of stored difference values.

29. The method of claim 28 wherein the average comprises a moving window average.

30. The method of claim 28 wherein the average comprises a weighted average.

31. The method of claim 22 wherein the plurality of stored difference values are consecutive values.

32. The method of claim 22 wherein the plurality of stored difference values are non-consecutive values.

33. The method of claim 22 wherein the plurality of stored difference values comprise values sampled from a larger population of stored difference values associated with the forming tool.

34. The method of claim 22 embodied as a series of software instructions in a processor readable medium accessible by a microprocessor for controlling the forming operation.

35. In a progressive forming system, a method for minimizing formed product deviations introduced by a combination of unformed component deviation and forming tool performance deviation, comprising:

detecting fiducial features on an unformed incoming component;

calculating a first compensation value from displacement of one or more of the fiducial features from an ideal forming location;

adjusting, according to the first compensation value, a position of the component with respect to a forming tool;

sequentially forming by means of the forming tool a plurality of features on the component at the adjusted position;

detecting placement of each feature formed on the component;

comparing the placement of each formed feature to the ideal forming location to obtain a difference value for each formed feature;

storing each difference value in a processor-readable memory;

calculating a second compensation value for each formed feature from a plurality of stored difference values obtained from other components previously formed by the forming tool; and sequentially adjusting, according to the second compensation value of each feature to be sequentially formed, and according to a first compensation value, a position of a subsequent incoming component with respect to the forming tool.

36. In a progressive forming system having a progression of forming steps, a method for minimizing product defects introduced by unformed components and/or forming tool errors, the method comprising:

detecting fiducial features on an incoming component;

calculating a first compensation value from displacement of one or more of the fiducial features from an ideal forming location;

(a) adjusting, according to the first compensation value, a position of the component with respect to a theoretical forming position;

(b) forming by means of a forming tool a feature on the component at the adjusted position;

(c) detecting placement of the feature formed on the component by the forming tool;

(d) comparing the placement to the ideal forming location to obtain a difference value associated with the forming tool;

(e) storing the difference value in a processor-readable memory;

(f) repeating steps (a) through (e) for each forming step;

calculating a second compensation value for each forming tool from a plurality of stored difference values associated with each forming tool; and for each forming step performed on a subsequent incoming component, adjusting a position of the subsequent incoming component with respect to each forming tool according to the second compensation value associated with the forming tool, and according to a first compensation value.

37. A closed-loop forming system for manufacturing at a high capability index, comprising:

a loading station for loading an incoming component;

an imaging subsystem for detecting a deviation on the component;

a computer subsystem for calculating a first compensation value according to the deviation;

a conveyor for moving the component to a position at a forming station, the position adjusted from a theoretical forming position according to the first compensation value; and a forming tool for forming a feature on the component;

whereby the imaging subsystem detects placement of the feature formed on the component, the computer subsystem compares the placement to an ideal forming location to obtain a difference value, and the conveyor adjusts a position of a subsequent incoming component with respect to the theoretical forming position according to the difference value, and according to a first compensation value.

38. The system of claim 37 wherein the computer subsystem comprises a control system for actuating the loading station, the imaging subsystem, the conveyor, and the forming tool.

39. The system of claim 37 wherein the forming tool forms a plurality of features on the component at the adjusted position, wherein the imaging subsystem detects placement of each feature formed on the component, wherein the computer subsystem compares the placement of each feature to an ideal forming location to obtain a difference value for each feature, and wherein the conveyor adjusts a position of a subsequent incoming component with respect to the theoretical forming position, according to the difference value associated with the feature to be formed.

40. The system of claim 37 wherein the computer subsystem stores the difference value in memory.

41. The system of claim 40 wherein the computer subsystem calculates a second compensation value from a plurality of stored difference values.

42. The system of claim 41 wherein the conveyor adjusts, according to the second compensation value, a position of a subsequent incoming component with respect to the theoretical forming position.

43. The system of claim 41 wherein the second compensation value represents an average of the plurality of stored difference values.

44. The system of claim 43 wherein the average comprises a moving window average.

45. The system of claim 43 wherein the average comprises a weighted average.

46. The system of claim 41 wherein the plurality of stored difference values are consecutive values.

47. The system of claim 41 wherein the plurality of stored difference values are non-consecutive values.

48. The system of claim 41 wherein the plurality of stored difference values comprise sampled values.

49. The system of claim 48 wherein the sampled values are obtained by random sampling.

50. The system of claim 48 wherein the sampled values are obtained by periodic sampling.

51. The system of claim 48 wherein the sampled values are obtained by non-periodic sampling.

52. The system of claim 37 wherein the deviation detected by the imaging subsystem comprises a displacement of one or more fiducial features from a desired placement.

53. The system of claim 52 wherein the one or more fiducial features include at least one geometric feature.

54. The system of claim 53 wherein the geometric feature is photo-chemically etched on the incoming component.

55. The system of claim 53 wherein the geometric feature is stamped on the incoming component.

56. The system of claim 37 wherein the imaging subsystem comprises a digital imaging system and pattern recognition software.

57. A closed loop progressive forming system for minimizing product defects introduced by unformed components and/or forming tool errors, comprising:
 a loading station for loading an incoming component;
 an imaging subsystem for detecting a deviation on the component;
 a computer subsystem for calculating a first compensation value according to the deviation; and
 a conveyor for moving the component between forming stations; whereby at each forming station
  (a) the conveyor adjusts, according to the first compensation value, a position of the component with respect to a theoretical forming position;
  (b) a forming tool forms a feature on the component at the adjusted position;
  (c) the imaging system detects placement of the feature formed on the component;
  (d) the computer subsystem compares the placement to an ideal forming location to obtain a difference value for the forming tool, stores the difference value, and calculates a second compensation value from a plurality of stored difference values associated with the same forming tool; and whereby
 for each forming step performed on a subsequent incoming component, the conveyor adjusts a position of the subsequent incoming component with respect to each theoretical forming position according to the second compensation value associated with the forming tool, and according to a first compensation value.

58. The system of claim 57 wherein the computer subsystem comprises a control system for actuating the loading station, the imaging subsystem, the conveyor, and the forming tools.

59. The system of claim 57 wherein the deviation detected by the imaging subsystem comprises a displacement of one or more fiducial features from a desired placement.

60. The system of claim 57 wherein the second compensation value represents an average of the plurality of stored difference values.

61. The system of claim 60 wherein the average comprises a moving window average.

62. The system of claim 60 wherein the average comprises a weighted average.

63. The system of claim 57 wherein the plurality of stored difference values are consecutive values.

64. The system of claim 57 wherein the plurality of stored difference values are non-consecutive values.

65. The system of claim 57 wherein the plurality of stored difference values comprise sampled values.

66. The system of claim 65 wherein the sampled values are obtained by random sampling.

67. The system of claim 65 wherein the sampled values are obtained by periodic sampling.

68. The system of claim 65 wherein the sampled values are obtained by non-periodic sampling.

* * * * *